United States Patent [19]

Kotamäki

[11] Patent Number: 4,671,396
[45] Date of Patent: Jun. 9, 1987

[54] ONE-WAY CLUTCH STRUCTURE FOR A STATIONARY EXERCISE CYCLE

[75] Inventor: Esko Kotamäki, Turku, Finland

[73] Assignee: Tunturipyörä Oy, Finland

[21] Appl. No.: 701,142

[22] Filed: Feb. 13, 1985

[30] Foreign Application Priority Data

Nov. 16, 1984 [FI] Finland ................................. 844504

[51] Int. Cl.⁴ ...................... F16D 41/20; F16D 41/34
[52] U.S. Cl. .................................... 192/41 S; 192/64; 192/81 C
[58] Field of Search ...................... 192/64, 41 S, 81 C; 384/129, 273

[56] References Cited

U.S. PATENT DOCUMENTS

| 1,753,434 | 4/1930 | Klocke | 384/129 |
| 2,643,749 | 6/1953 | Greenlee | 192/41 S |
| 2,971,394 | 2/1961 | Christensen | 192/81 C X |
| 3,529,703 | 6/1968 | Kroeker | 192/26 |
| 3,618,721 | 11/1971 | Hare | 192/41 S X |
| 3,709,341 | 5/1971 | Schulz | 192/64 |
| 3,865,220 | 2/1975 | Thompson, Jr. | 192/64 X |

FOREIGN PATENT DOCUMENTS

| 1053000 | 3/1959 | Fed. Rep. of Germany | 192/81 C |
| 2622538 | 4/1977 | Fed. Rep. of Germany | 192/26 |
| 1183478 | 3/1970 | United Kingdom . | |

OTHER PUBLICATIONS

Hodge, Raymond, "Coiled Spring Works Ratchet Wrench" in *Ideas From Practical Men*, Aug. 19, 1943, p. 103.

Primary Examiner—Rodney H. Bonck
Assistant Examiner—David A. Testardi
Attorney, Agent, or Firm—Scully, Scott, Murphy and Presser

[57] ABSTRACT

The invention relates to a one-way clutch structure for a stationary exercise cycle, which structure comprises a flywheel journalled on an axle and a cog wheel for the transmission of the force created by treadling to said flywheel. Said one-way clutch structure allows, depending on the treadling velocity, the free rotation of the flywheel with respect to the cog wheel. In order to provide a one-way clutch structure of low manufacturing costs, the cog wheel is journaled on a first cylindrical surface formed in the center of the flywheel by means of a bushing member of plastic material. The coupling element is formed by a spring acting as a spring clutch known per se, which spring is fitted around the bushing member and a second cylindrical surface formed in the center, whereby the end of said spring which is on the side of the cog wheel is bent and locked in an opening provided on the cog wheel. A metal ring is fitted between the inner surface of the end of the bushing member which is on the side of the flywheel and the first cylindrical surface so as to prevent deformation of said bushing member.

6 Claims, 4 Drawing Figures

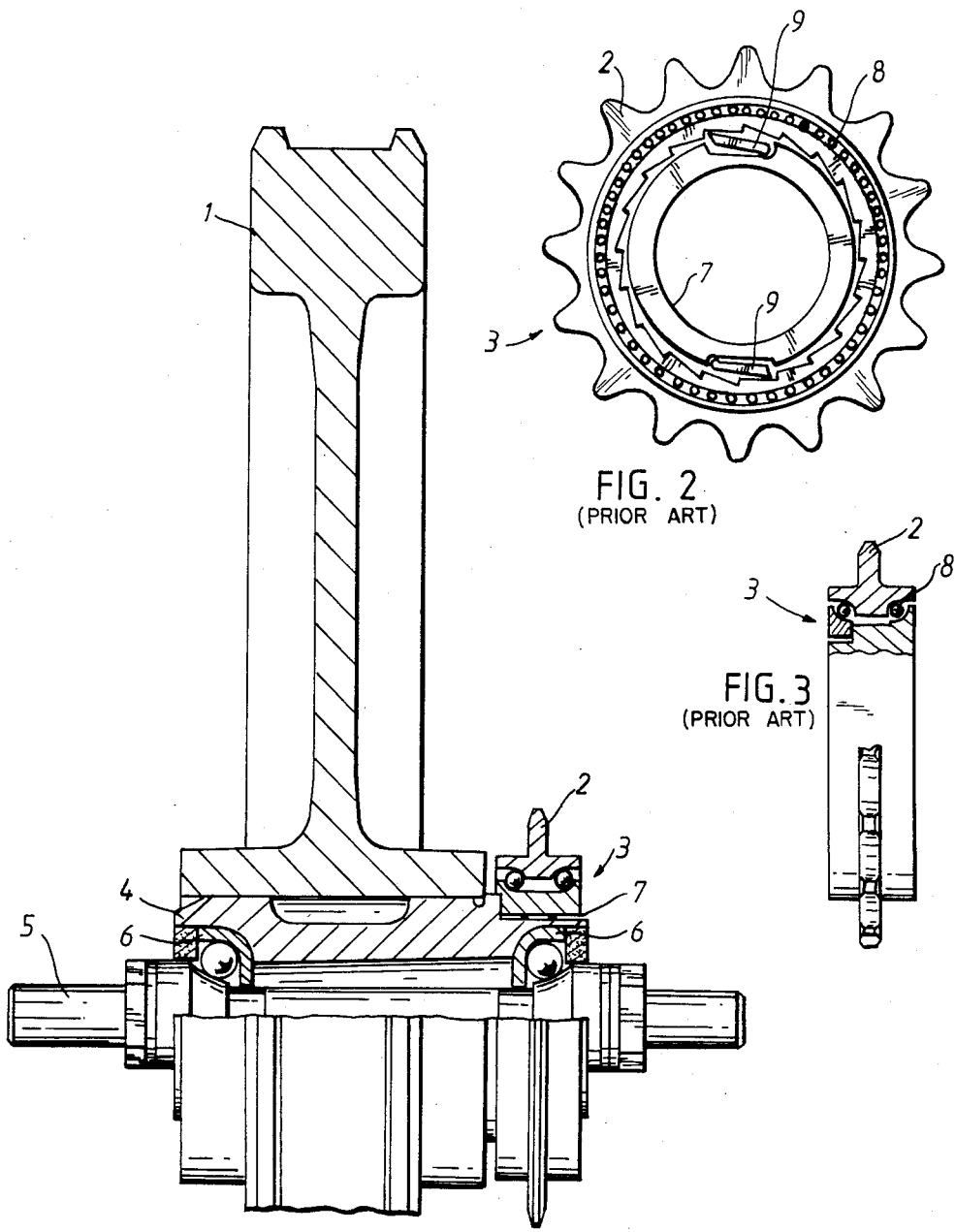

ONE-WAY CLUTCH STRUCTURE FOR A STATIONARY EXERCISE CYCLE

BACKGROUND OF THE INVENTION

The invention relates to a one-way clutch structure for a stationary exercise cycle, which structure comprises a flywheel journalled on an axle, and a cog wheel for the transmission of the force created by treadling to said flywheel, and which one-way clutch structure allows, depending on the treadling velocity, the free rotation of said flywheel with respect to the cog wheel.

In connection with stationary exercise cycles, the one-way clutch structure has always been effected in the same way as in bicycles. The cog wheel, which drives the flywheel, has thereby been journalled on a hub fastened on said flywheel. In general, a standard part, a so called wild wheel, has been used, in which the journalling has been effected by means of ball bearings and the coupling by means of a spring-loaded claw clutch which allows the free rotation velocity of the flywheel to exceed that of the cog wheel. The fly wheel, in turn, is in the known structures journalled on an axle by means of so called bicycle bearings fitted between the hub and the axle.

A disadvantage of said known structure is its complexity, which considerably increases the manufacturing costs. The complexity of the structure is due to the fact it is intended to be used in bicycles, whereby the object is to minimize the friction of free motion, which is a matter of importance in connection with bicycles in particular. With an exercise cycle, the friction of free motion, instead, is of much less importance than with bicycles. A further disadvantage of the previously used solutions is the noise problem, which is emphasized in indoor use.

SUMMARY OF THE INVENTION

The object of the invention is to provide a one-way clutch structure for a stationary exercise cycle, which avoids the disadvantages of the previously used solutions. This is achieved by means of a one-way clutch structure according to the invention, which, more particularly, is characterized in that the cog wheel is journalled on a first cylindrical surface provided in the center of the flywheel by means of a bushing member of plastic material, that a coupling element is formed by a spring acting as a spring clutch known per se, which spring is fitted around said bushing member and a second cylindrical surface formed in said center, whereby the end of said spring which is on the side of the cog wheel is bent and locked in an opening provided on the cog wheel, and that a metal ring is fitted between the inner surface of the end of the bushing member which is on the side of the flywheel and the first cylindrical surface so as to prevent deformation of said bushing member.

An advantage of the invention is, above all, its simplicity, whereby the manufacturing costs are essentially reduced compared with the previously used solutions. In addition, the clutch structure according to the invention is extremely durable, because it has, for instance, been possible to replace the bicycle bearings, which demand regular maintenance, with extremely durable ordinary bearings. The clutch structure according to the invention is completely silent, so it is extremely suitable for exercise cycles used indoors.

BRIEF DESCRIPTION OF THE DRAWINGS

The invention will be described more closely in the following by means of the prior art and one preferred embodiment of the invention, which are illustrated in the attached drawings, whereby FIG. 1 is a front view of the principal features of a one-way clutch structure according to the prior art, FIG. 2 is a side view of the principal features of a wild wheel used in the structure of FIG. 1, FIG. 3 is a front view of the wild wheel of FIG. 2.

DETAILED DESCRIPTION OF THE PREFERRED EMBODIMENTS

Figure 4:
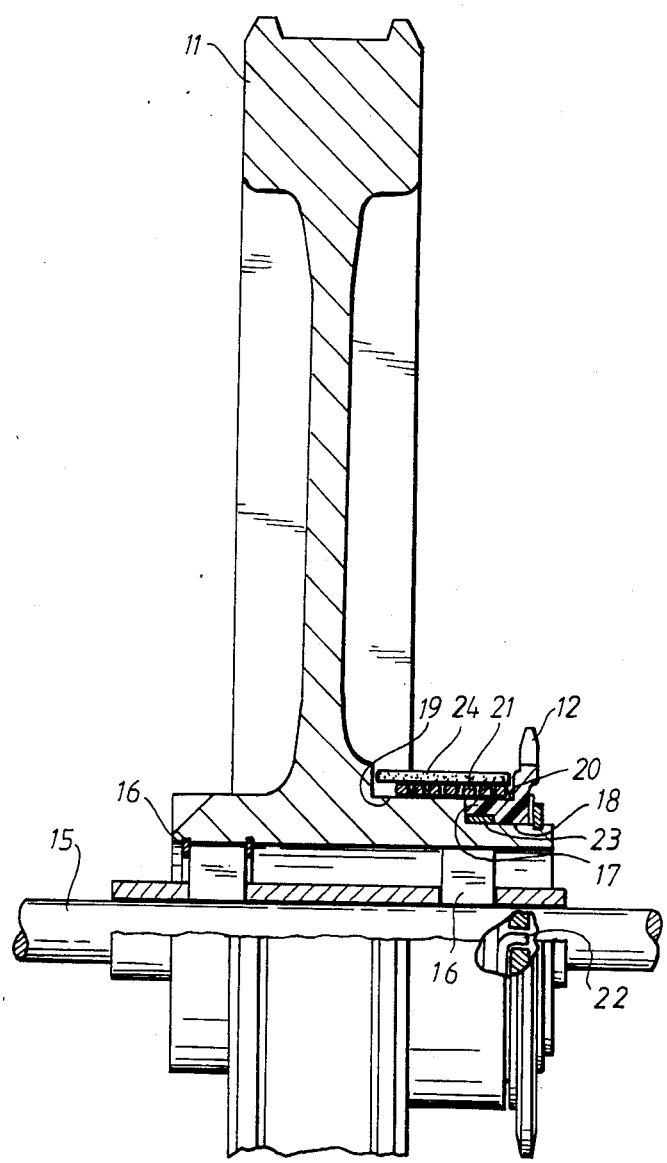
FIG. 4 is a front view of the principal features of a one-way clutch structure according to the invention.

FIGS. 1–3 illustrate the principal features of a solution according to the prior art. A flywheel is designated by means of the reference numeral 1. A cog wheel, in turn, is designated by the reference numeral 2. A so called wild wheel mechanism attached to said cog wheel is designated as a whole by means of the reference numeral 3. Said wild wheel mechanism 3 is described in more detail in FIGS. 2 and 3. A hub fastened on said fly wheel is designated by the reference numeral 4 in FIG. 1. An axle on which said flywheel is journalled by means of the hub 4 is designated by the reference numeral 5. Ordinary, so called bicycle bearings 6 are used in said journalling.

Said cog wheel 2 is journalled on the hub 4 by means of the wild wheel mechanism 3. Said wild wheel mechanism is thereby fastened on the hub 4 by means of a threaded coupling 7. The structure of the wild wheel mechanism 3 appears from FIGS. 2-3. The structure is generally known, so only a bearing 8 and arresting parts 9 are mentioned in this connection, the function of said parts being clear to one skilled in the art.

As appears from FIGS. 1-3, the structure according to the prior art is extremely complicated and, accordingly, expensive. Besides, this kind of structure is not very durable, because the bearings 6, for instance, require relatively frequent maintenance, if a flawless function of the device is expected. A further disadvantage of the known structure is that the wild wheel mechanism is a so called standard part having certain dimensions of inner diameter only. Thus it has not been possible to fit the wild wheel in place without the hub 4. This is due to the fact that the material thicknesses would be too small, if the fastening point required by the wild wheel were formed directly on the flywheel 1. The structure would thereby not endure the strains caused by use.

A one-way clutch structure according to the invention is shown in FIG. 4. A flywheel is designated by the reference numeral 11 in FIG. 4. A cog wheel, in turn, is designated by the reference numeral 12.

An axle on which the flywheel 11 is journalled is designated by the reference numeral 15. Ordinary bearings 16 are used in said journalling.

The cog wheel 12 is, according to the invention, journalled on a first cylindrical surface 18 provided in the center of the flywheel 11 by means of a bushing member 17 of plastic material. No bearing is thereby needed, because the plastic material acts as a bearing in a manner known per se. Besides the first cylindrical surface 18, the center of the flywheel is provided with a second cylindrical surface 19. The cylindrical surfaces 18, 19 and the bushing member 17 are so dimensioned that the outer surface 20 of the bushing member and the second cylindrical surface 19 form, in the completed structure, an essentially integral flat surface.

In the clutch structure according to the invention, the coupling element is formed by a spring 21 known per se, which is fitted around the bushing member 17 and the second cylindrical surface 19 formed in said center. The inner diameter of the spring 21 is thereby slightly smaller than the diameter of the surfaces 19, 20. The end 22 of the spring 21 which is on the side of the cog wheel is bent and locked in an opening provided on the cog wheel 12. On the other hand, the end of the spring 21 which is on the side of the flywheel 11 is not fastened anywhere, but is positioned freely on the second cylindrical surface 19. The spring 21 acts as a coupling member in a manner known per se, i.e. when the cog wheel is rotated so that the spring 21 is tightened against the surfaces 19, 20, whereby the clutch is closed and the flywheel starts to rotate with the cog wheel. This takes place when the exercise cycle is treadled. If the treadling is, for instance, stopped, the force tightening said spring 21 disappears, whereby the spring is slackened and the flywheel can rotate freely with respect to the cog wheel. The clutch is thereby in an open position. The above principle of function of a spring clutch is per se known to one skilled in the art, so the matter will not be described more closely in this connection.

According to the invention, a metal ring 23 is fitted between the inner surface of that end of the bushing member 17 of plastic material which is on the side of the flywheel and the first cylindrical surface 18. Said metal ring 23 is intended to prevent deformation of the bushing member 17. It has been found out in practice that in a coupling situation, i.e. when the spring is tightened around the surfaces 19, 20, extremely high strains are created especially at the end of the bushing member 17 which is on the side of the flywheel, wherein the coupling practically takes place. If any deformations should occur in the bushing member 17, this could result in deadlock, whereby it would not any more be possible to open the clutch.

Said metal ring can be any ring, though a discontinuous ring made of a ribbon-like material has proved to be especially advantageous. The free ends of the material strip are confronted, but they are by no means fastened together. So the ring is not continuous, but the confronted ends form a point of discontinuity. Rings of this type can be manufactured in a very inexpensive manner, for instance by winding ribbon-like material in a spring-like manner and by cutting off and mangling the obtained ring blanks into said discontinuous rings.

Said metal ring 23 can, if necessary, be fastened on the bushing member 17 in any suitable manner, but said fastening is not necessary at all. It has proved especially advantageous to fit the metal ring 23 with a suitable clearance both on the bushing member 17 and the first cylindrical surface 18 of the center of the flywheel.

The above-described embodiment is by no means intended to restrict the invention, but the invention can be modified in various ways within the scope of the claims. Accordingly, the manufacturing material of the cog wheel 12, for instance, is by no means restricted. It has proved especially advantageous to form the cog wheel 12 of plastic material as an integral part of the bushing member 17. An advantage of a cog wheel made of plastic material is, besides low manufacturing costs, that the plastic wheel damps the noise caused by the chain and contributes to the lowering of the noise level of the exercise cycle. There is, however, nothing to hinder the manufacturing of the cog wheel of metal and joining it to the bushing member 17, which is made of plastic material, if this kind of solution is considered necessary. It is also clear that the different parts do not, of course, need to be exactly similar to those illustrated in the figures, but parts of other kind can be used as well. So, for instance, the axle 15, the bearings 16 etc. can be freely chosen as required. In principle, the spring 21 can be left uncovered, but, in practice, it is advantageous to protect the spring in a suitable manner, for instance by using a cover 24 which is made of plastic or other suitable material.

I claim:

1. A one-way clutch structure for an exercise cycle, comprising:
   an axle;
   a flywheel journalled on the axle, and including a central portion extending around the axle and having a first outside circumferential surface;
   a plastic bushing rotatably mounted on the central portion of the flywheel, and including an annular flange having a second outside circumferential surface axially located adjacent the first circumferential surface;
   a cog wheel mounted on the plastic bushing to rotate therewith around the axle;
   a spring clutch having a first end connected to the cog wheel for rotation therewith, and extending around the first and second outside circumferential surfaces, the spring clutch having an engaged position, wherein the spring clutch tightly engages the first and second outside circumferential surfaces and exerts a radially inward force thereon to connect the fly-wheel to the bushing for rotation therewith, and a disengaged position wherein the flywheel is free to rotate around the axle independent of the plastic bushing; and
   a metal reinforcing band circumferentially extending around the central portion of the flywheel, radially located between said central portion and the annular flange of the bushing, to support said annular flange against the radially inward pressure of the spring clutch and inhibit deformation of the annular flange, the metal reinforcing band being fitted with clearance between both the central portion of the flywheel and the annular flange of the bushing.

2. A one-way clutch structure according to claim 1 wherein the metal band is discontinuous and includes confronted first and second circumferential ends.

3. A one-way clutch structure according to claims 1 or 2, wherein the cog wheel is made of a plastic material and is integrally connected to the plastic bushing.

4. A one-way clutch structure according to claim 1, wherein:
   the central portion of the flywheel includes
   (i) a first annular flange having a first diameter, said first annular flange defining the first outside circumferential surface, and
   (ii) a second annular flange having a second diameter, less than the first diameter, and axially extending outward from the first annular flange;
   the first annular flange defines a first radial surface radially extending to the second annular flange from the first outside circumferential surface;
   the plastic bushing has an inside diameter substantially equal to said second diameter and is directly mounted on said second annular flange;

the plastic bushing defines a second radial surface radially extending between the second annular flange of the central portion of the flywheel and the annular flange of the plastic bushing; and the reinforcing metal band is axially captured between said first and second radial surfaces.

5. A one-way clutch structure for an exercise cycle, comprising:

an axle;

a flywheel journalled on the axle, and including
  (i) a central portion extending around the axle and including (a) a first annular flange having a first diameter, and (b) a second annular flange having a second diameter, less than the first diameter, and axially extending outward from the first annular flange, the first annular flange defining a first outside circumferential surface and a first radial surface radially extending to the second annular flange from the first outside circumferential surface, and
  (ii) means defining a second radial surface radially extending outward from the first annular flange;

a plastic bushing having an inside diameter substantially equal to said second diameter, and rotatably, directly mounted on said second annular flange, the plastic bushing including an annular flange having a second outside circumferential surface axially located adjacent the first circumferential surface, and the plastic bushing defining a third radial surface radially extending between the second annular flange of the central portion of the flywheel and the annular flange of the plastic bushing;

a cog wheel radially extending outward from the plastic bushing, and mounted thereon to rotate with the plastic bushing around the axle;

a spring clutch extending around the first and second outside circumferential surfaces, axially held between the cog wheel and said second radial surface, having a first end connected to the cog wheel for rotation therewith, and the spring clutch having an engaged position, wherein the spring clutch tightly engages the firs and second outside circumferential surfaces and exerts a radially inward force thereon to connect the flywheel to the bushing for rotation therewith, and a disengaged position wherein the flywheel is free to rotate around the axle independent of the plastic bushing;

a spring cover circumferentially extending around the spring clutch, and axially held between the cog wheel and said second radial surface; and a metal reinforcing band circumferentially extending around the central portion of the flywheel, radially located between said central portion and the annular flange of the bushing, and axially captured between said first and third radial surfaces, to support said annular flange against the radially inward pressure of the spring clutch and inhibit deformation of the annular flange.

6. A one-way clutch structure according to claim 5, wherein:

the annular flange of the plastic bushing has an inside diameter less than said first diameter and greater than said second diameter;

the metal reinforcing band has an inside diameter greater than the diameter of the second annular flange to provide clearance between said second annular flange and the metal reinforcing band, and an outside diameter less than the inside diameter of the annular flange of the plastic bushing to provide clearance between the metal reinforcing band and the annular flange of the plastic bushing.

* * * * *